(12) United States Patent
Carru et al.

(10) Patent No.: US 11,366,920 B1
(45) Date of Patent: Jun. 21, 2022

(54) FINE-GRAINED ACCESS CONTROL VIA DATABASE ROLES

(71) Applicant: Snowflake Inc., Bozeman, MT (US)

(72) Inventors: Damien Carru, New York, NY (US); Pui Kei Johnston Chu, Unionville (CA); Benoit Dageville, San Carlos, CA (US); Shreyas Narendra Desai, Bellevue, WA (US); Subramanian Muralidhar, Mercer Island, WA (US); Bowen Zhang, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/464,538

(22) Filed: Sep. 1, 2021

Related U.S. Application Data

(60) Provisional application No. 63/237,490, filed on Aug. 26, 2021.

(51) Int. Cl.
  *G06F 21/62* (2013.01)
  *G06F 16/25* (2019.01)
  *G06F 16/21* (2019.01)

(52) U.S. Cl.
  CPC .......... *G06F 21/6218* (2013.01); *G06F 16/21* (2019.01); *G06F 16/256* (2019.01); *G06F 2221/2141* (2013.01)

(58) Field of Classification Search
  CPC .... G06F 21/6218; G06F 16/256; G06F 16/21; G06F 2221/2141
  USPC .......................................................... 707/802
  See application file for complete search history.

(56) References Cited

U.S. PATENT DOCUMENTS

| | | | |
|---|---|---|---|
| 10,613,737 B1 * | 4/2020 | Morris | H04L 51/08 |
| 2002/0184401 A1 * | 12/2002 | Kadel, Jr. | G06F 9/54 |
| | | | 719/315 |
| 2020/0159514 A1 * | 5/2020 | Brooks | G06F 16/289 |

OTHER PUBLICATIONS

Moyer, Matthew J., et al., "Generalized Role-Based Access Control", ICDSC 2001, Mesa, AZ, Apr. 16-19, 2001, pp. 391-398.*

* cited by examiner

*Primary Examiner* — Robert Stevens
(74) *Attorney, Agent, or Firm* — Womble Bond Dickinson (US) LLP

(57) ABSTRACT

Embodiments of the present disclosure provide systems and methods for defining database roles to allow sharing of the objects within a database in a more granular fashion. A database role is created within a database, and privileges are granted to the database role by a provider account. The database role may be granted to a share object, which would result in the share object being indirectly granted all privileges that have been granted to the database role. Once the share object has been hydrated in the consumer account, the local administrator can then decide which local roles are granted usage on the shared database role, thus ultimately allowing some level of filtering as to which shared objects can be accessed by which local roles.

21 Claims, 14 Drawing Sheets

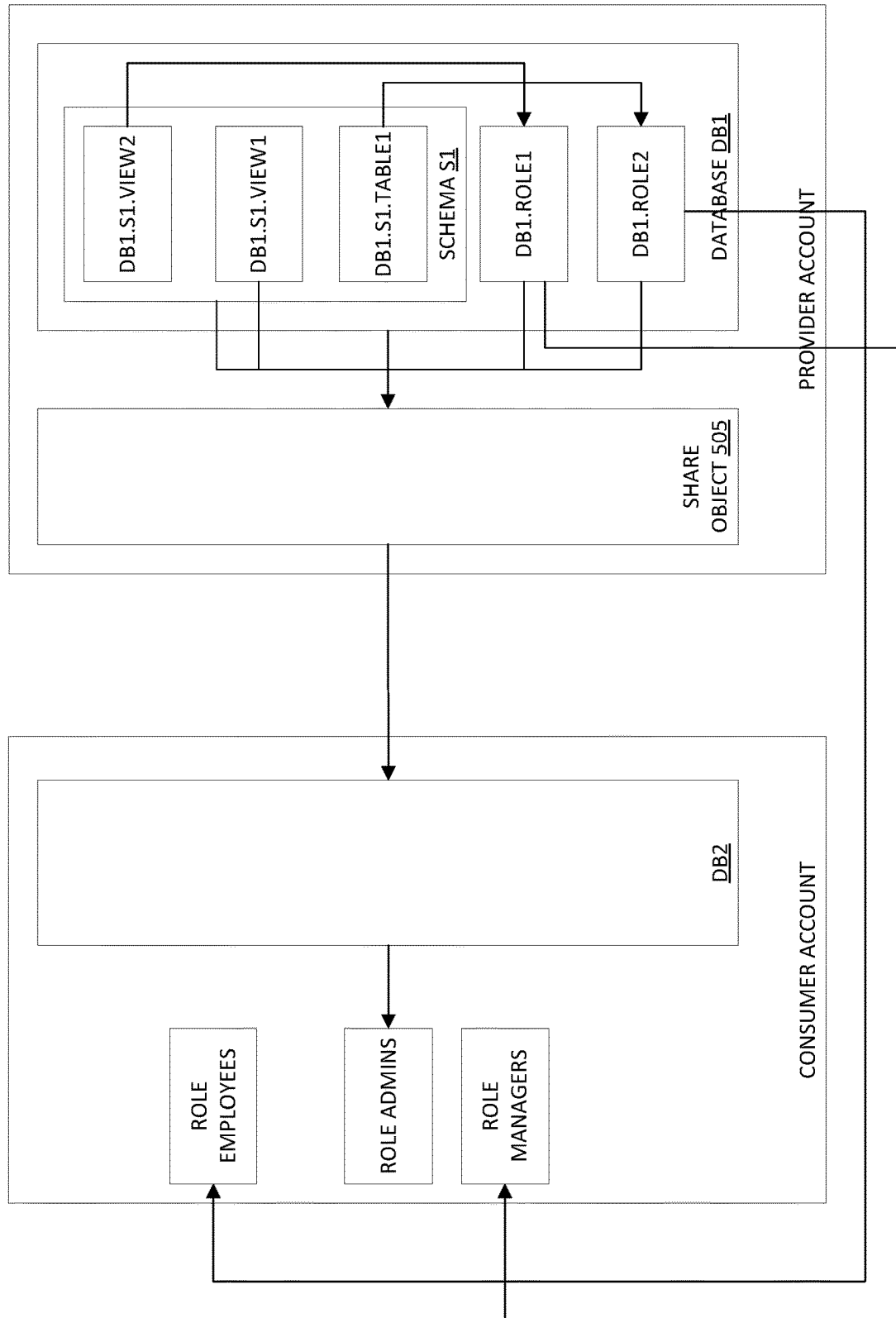

FINE-GRAINED ACCESS CONTROL VIA DATABASE ROLES

PRIORITY CLAIM

This application claims priority to U.S. provisional application No. 63/237,490, filed on Aug. 26, 2021 and entitled "FINE-GRAINED ACCESS CONTROL VIA DATABASE ROLES," the disclosure of which is hereby incorporated by reference.

TECHNICAL FIELD

The present disclosure relates to data sharing platforms, and particularly to modularizing the sharing of data.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 5A-5D are a block diagrams illustrating the lifecycle of a data sharing operation that utilizes database roles, in accordance with some embodiments of the present invention.

DETAILED DESCRIPTION

Figure 1A:
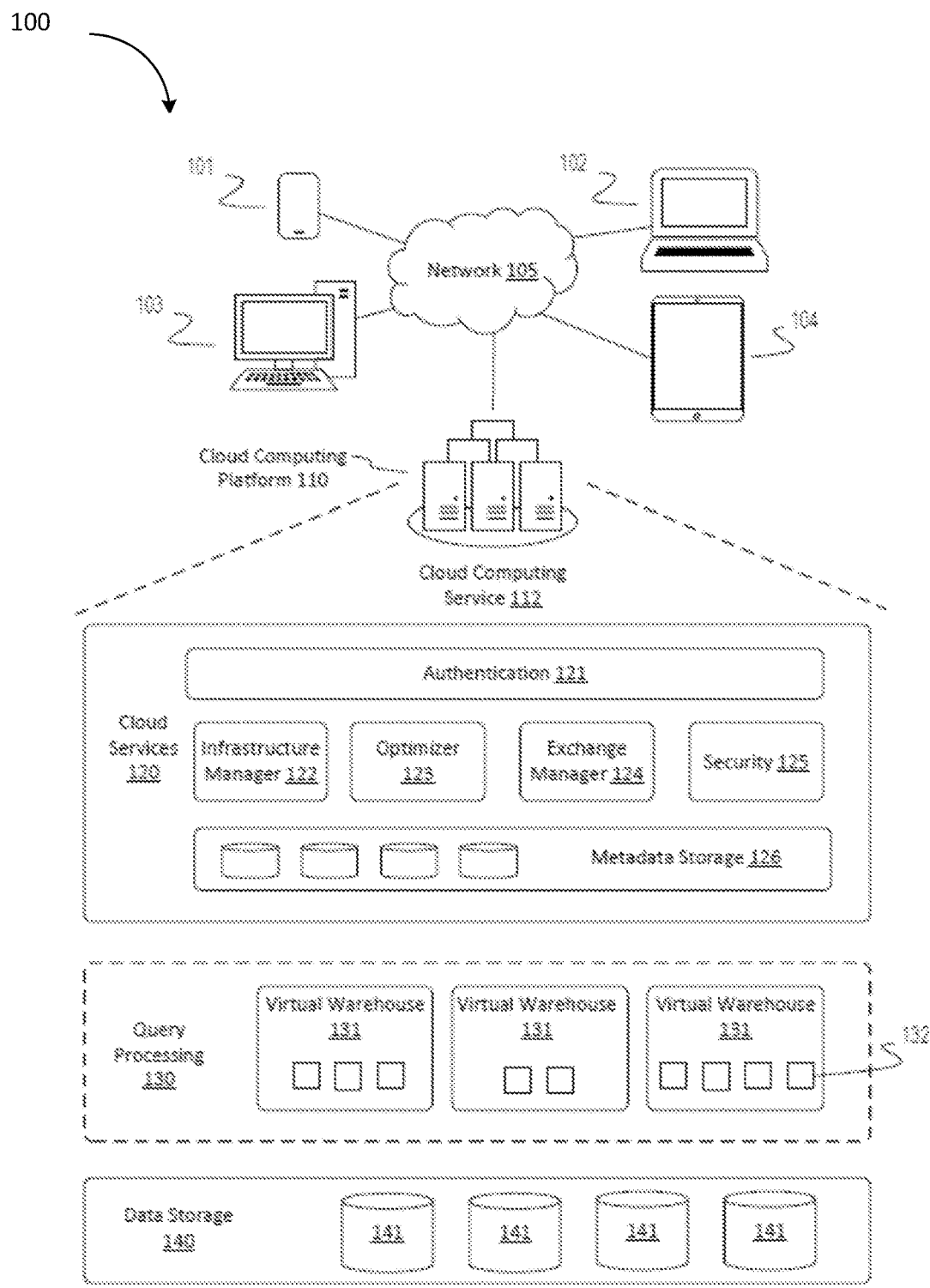
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as SNOWFLAKE™, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "Snowflake data marketplace," or a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Today, when a consumer wishes to grant access to a shared database to an account level role, all the shared objects granted to the share will be made available to the local grantee: there is no mechanism for a consumer to select which particular objects should be made available to local roles. To circumvent this, providers may logically separate source data into separate shares to manage access. However, in such scenarios, the provider has to manage a large number of shares and in extreme cases, one share per consumer. Any object added by the provider needs to be added to each eligible share object and unless each consumer has a share object, consumers have to deal with several imported databases and might have to drop an imported database and import a newer one. On the consumer side, consumers may attempt to circumvent the inability to scope the privileges granted to particular users by creating a database and generating views that map to each object in the share. However, this is cumbersome—especially with hundreds and thousands of views. Every consumer has to implement this methodology and it only works for views and tables, and does not work for shared functions. Any object added to a share needs to result in creation of new objects by the consumer.

Embodiments of the present disclosure address the above noted and other problems by defining a database role that is created within a database, and to which privileges are granted by a provider account. The database role may be granted to a share object, which would result in the share object being indirectly granted all privileges that have been granted to the database role. Once the share object has been hydrated in the consumer account, the local administrator can then decide which local roles are granted usage on the shared database role, thus ultimately allowing some level of filtering as to which shared objects can be accessed by which local roles.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

Figure 1B:
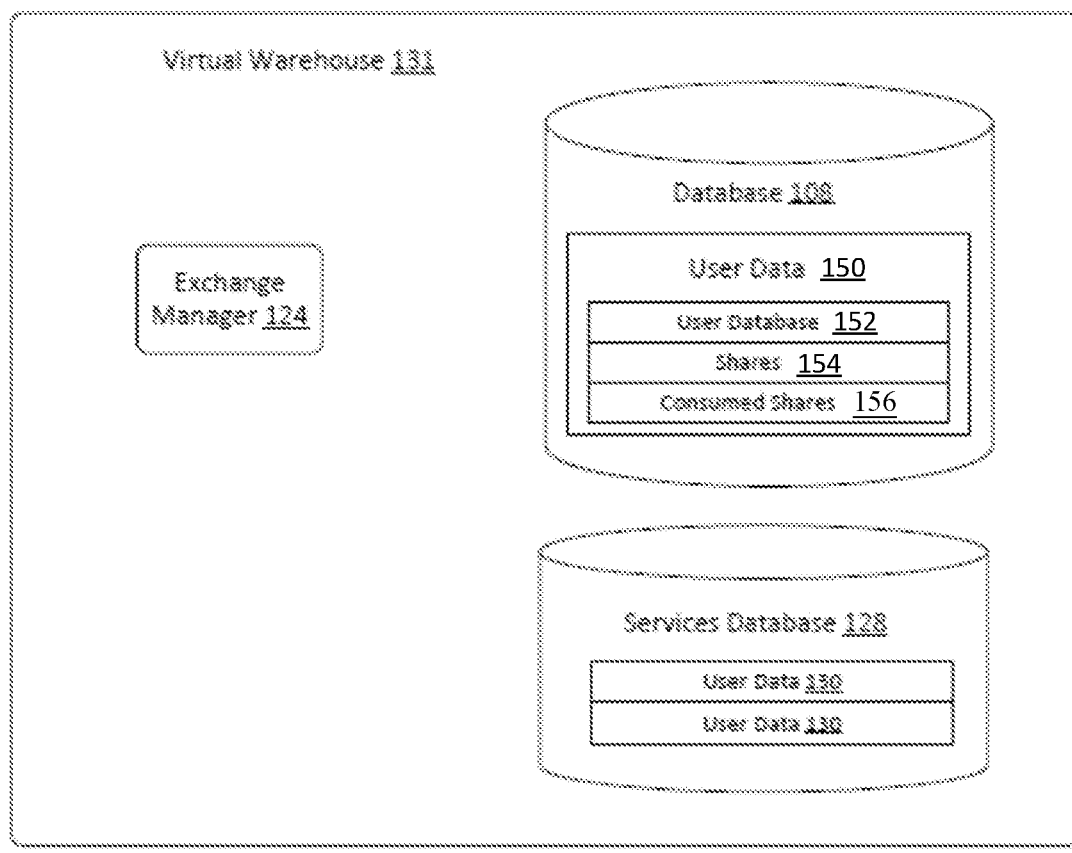
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
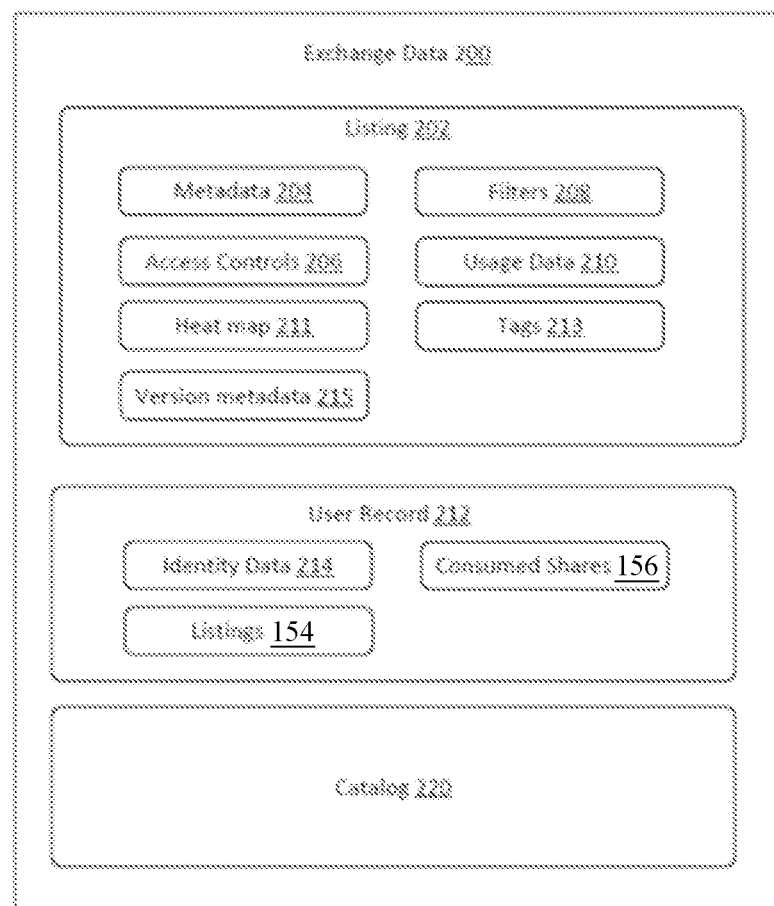
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Note that some listings 202 may be discoverable by users without further authentication or access permissions whereas actual accesses are only permitted after a subsequent authentication step. The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 130 in service database 128 and managed by the virtual warehouse 131.

The user record 212 may list shares 156 associated with the user, e.g., reference listings 154 created by the user. The user record 212 may list shares 156 consumed by the user, e.g. reference listings 202 created by another user and that have been associated to the account of the user according to the methods described herein. For example, a listing 202 may have an identifier that will be used to reference it in the shares 154 or consumed shares 156 of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified one or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3A:
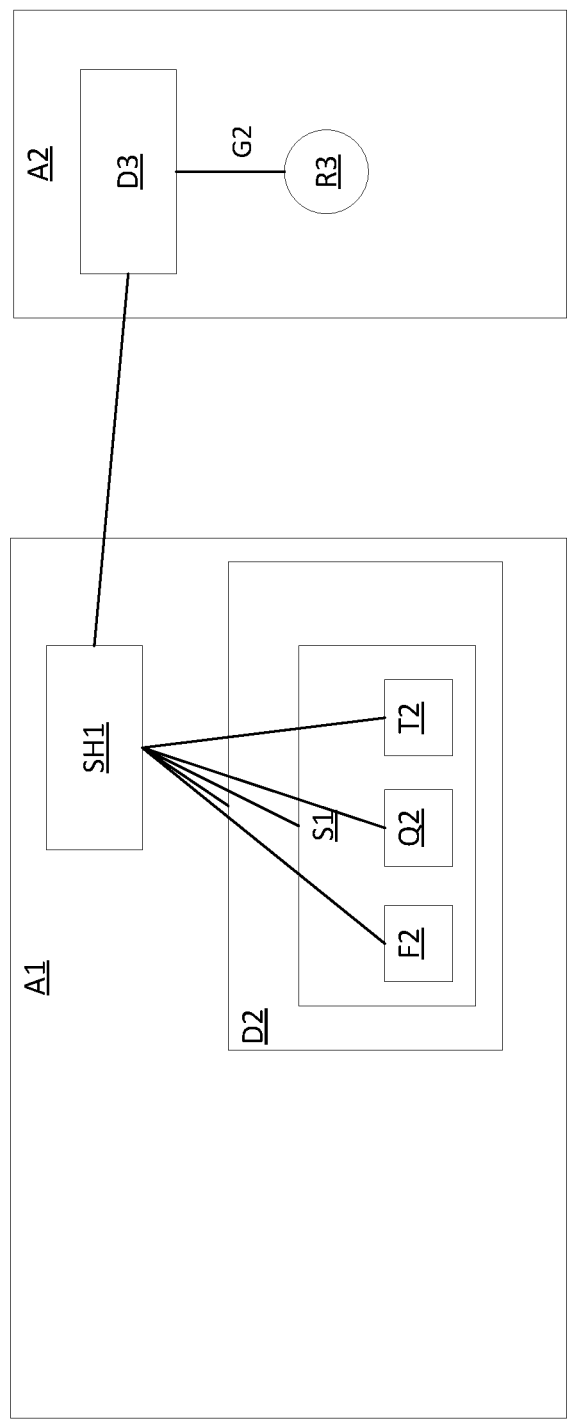
FIGS. 3A-3C are schematic block diagrams of consumer and provider managed data access techniques, in accordance with some embodiments of the present invention.

FIG. 3A illustrates a schematic block diagram illustrating share-based access to objects in provider accounts. A provider account A1 contains share object SH1, which includes grants to database D2, schema S1, and table T2. The grants on database D2 and schema S1 may be usage grants and the grant on table T2 may be a select grant. In this case, table T2 in schema S1 in database D2 would be shared read-only. Share object SH1 may contain a list of references (not shown) to various consumer accounts, including account A2.

After the share object SH1 is created, it may be imported or referenced by consumer account A2 (which has been listed in the share object SH1). Consumer account A2 may run a command to list all available share objects for importing. Only if a share object was created with references that included the consumer account A2, can consumer account A2 reveal the share object using the command to list all share objects and subsequently import it. In one embodiment, references to a share object in another account are always qualified by account name. For example, consumer account A2 would reference share SH1 in provider account A1 with the example qualified name "A1.SH1." Upon the share object SH1 being imported to consumer account A2 (the imported share object being shown as D3), an account level role R3 of the consumer account A2 may be given a usage grant G2 to share object D3. In this way, a user in account A2 with activated role R3 may access data in account A1. For example, a user in account A2 may read data in table T2 because role R3 has a usage grant on D3, which in turn has a select grant on table T2.

Figure 3B:
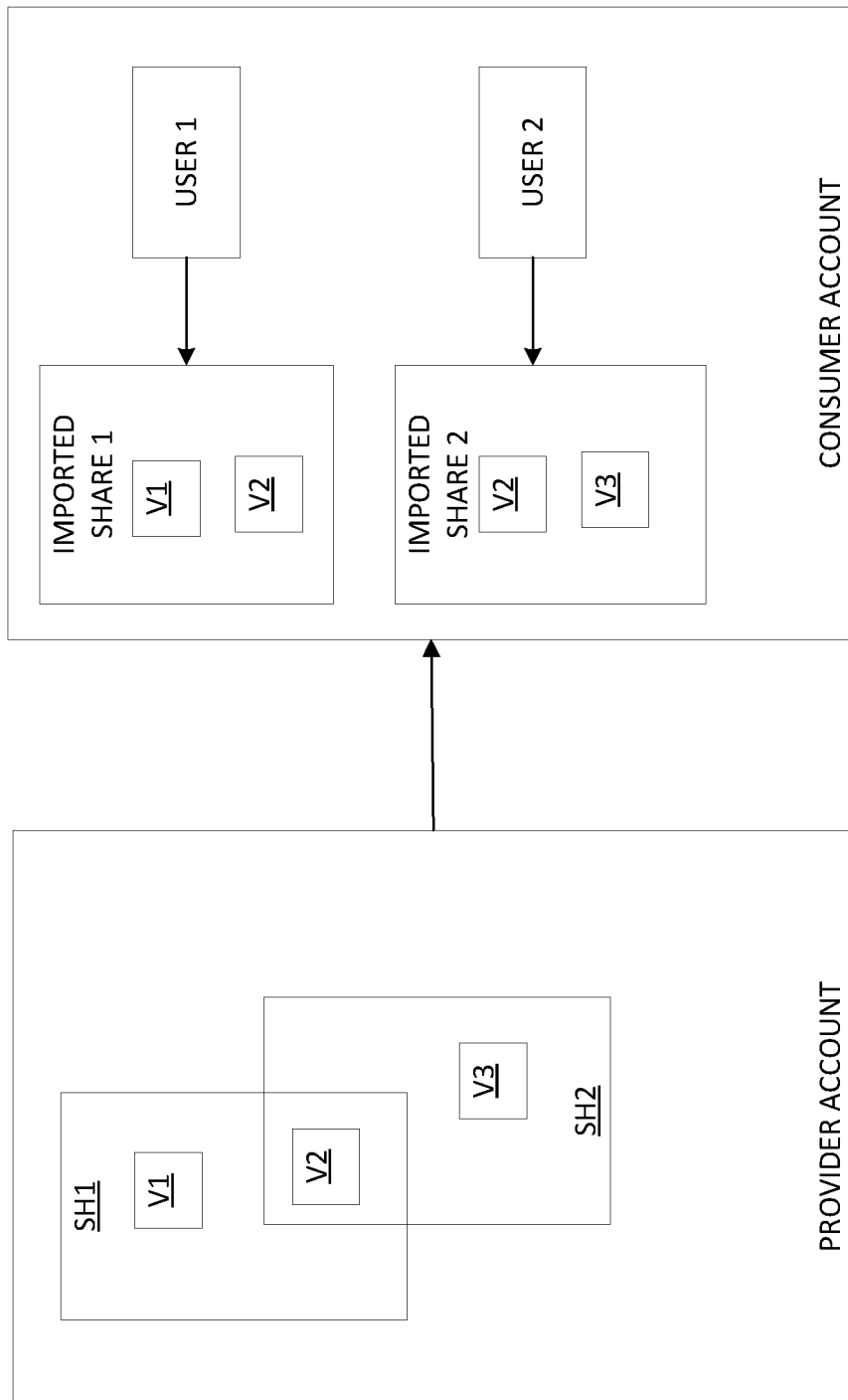
Figure 3C:
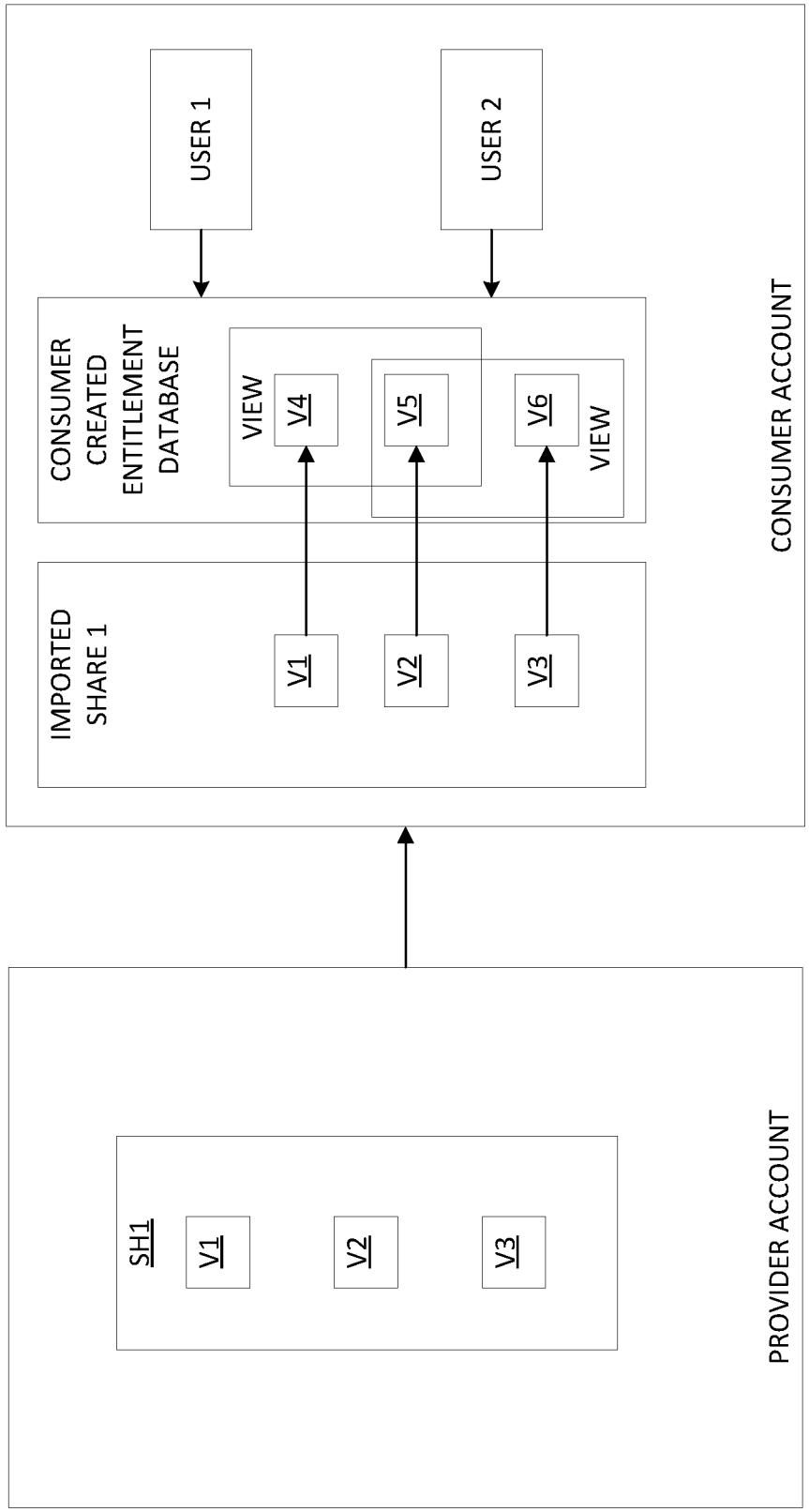

However, as can be seen in FIG. 3A, the privileges provided by the share object SH2 cannot be modularized to provide access to only certain objects (e.g., only T2 and F2) of the database D2 that the share object D3 has grants to. To circumvent this, providers may logically separate source data into separate shares to manage access, as shown in FIG. 3B. However, in such scenarios, the provider has to manage a large number of shares and in extreme cases, one share per consumer. Any object added by the provider needs to be added to each eligible share and unless each consumer has a share, consumers have to deal with several imported databases and might have to drop an imported database and import a newer one. On the consumer side, consumers may attempt to circumvent the inability to scope the privileges granted to particular users by creating a database and generating views that map to each object in the share, as shown in FIG. 3C. However, this is cumbersome—especially with hundreds and thousands of views. Every consumer has to implement this methodology and it only works for views and tables, and does not work for shared functions. Any object added to a share needs to result in creation of new objects by a consumer.

Figure 4:
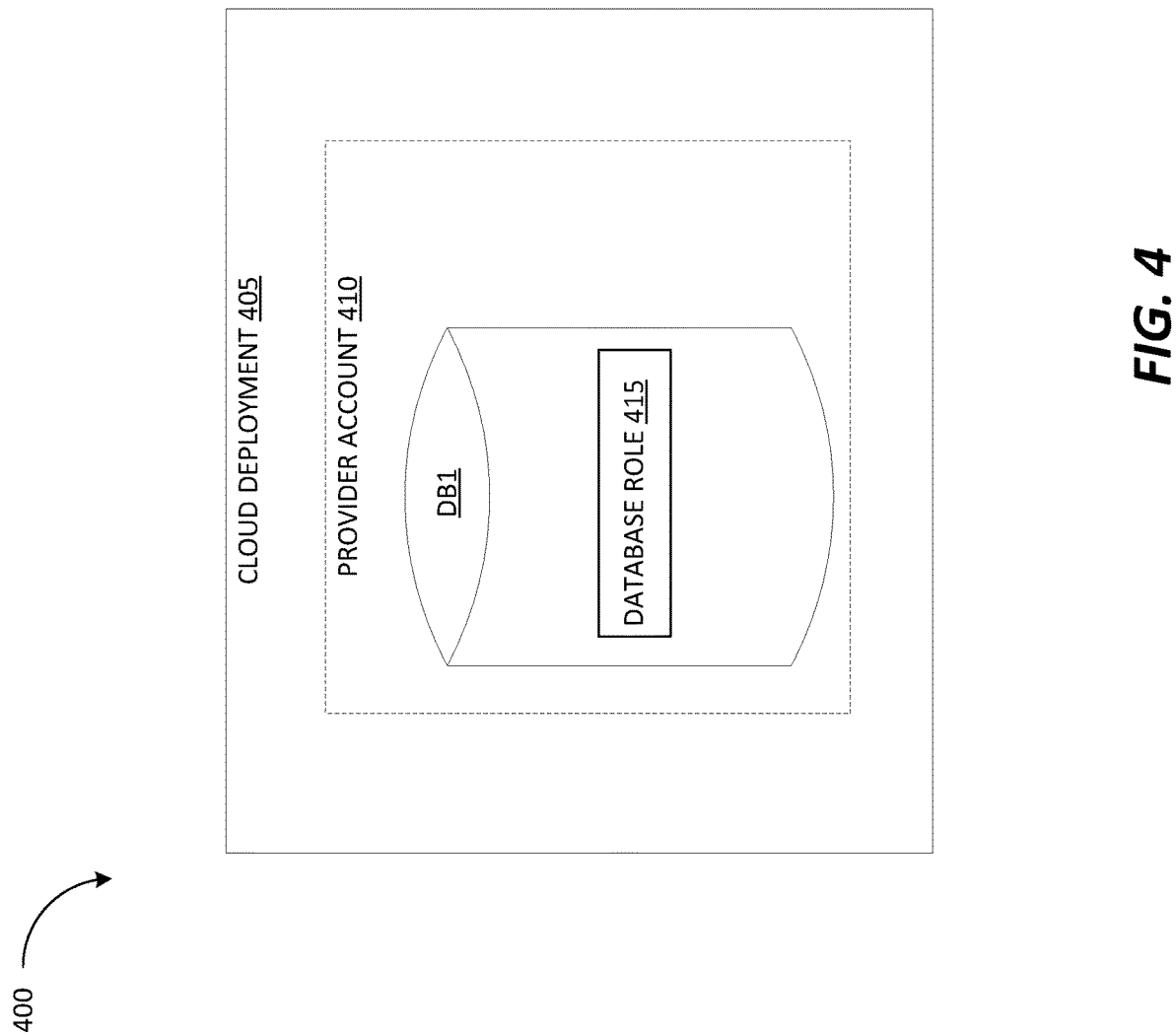
FIG. 4 is a block diagram of a cloud deployment of a data exchange, in accordance with some embodiments of the present invention.

FIG. 4 illustrates a cloud environment 400 comprising a cloud deployment 405, which may comprise a similar architecture to cloud computing service 112 (illustrated in FIG. 1A) and may be a deployment of a data exchange or data marketplace. Although illustrated with a single cloud deployment, the cloud environment 400 may have multiple cloud deployments which may be physically located in separate remote geographical regions but may all be deployments of a single data exchange or data marketplace. Databases and schemas may be used to organize data stored in the cloud deployment 405 and each database may belong to a single account within the cloud deployment 405. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. When performing any operations on objects within a database, the namespace is inferred from the current database and the schema that is in use for the session. If a database and schema are not in use for the session, the namespace must be explicitly specified when performing any operations on the objects. As shown in FIG. 4, the cloud deployment 405 may include a provider account 410 including database DB1.

FIG. 4 also illustrates a database role 415. A database role may function similarly to an account level role, except for the fact that the database role may be defined inside a database (e.g., DB1 in the example of FIG. 4) or any appropriate database container (e.g., a schema). The database role 415 may be an object that is of a different type than an account level role or any other object (e.g., may be a new object type) and may be referenced using a qualifier based on the name of the database it is created within (e.g., DB1.ROLE1). Although the database role 415 may be similar to an account level role with respect to grants of privileges that can be assigned, the database role 415 may exist exclusively within database DB1 (in which it was defined). Thus, privileges granted to the database role 415 must be limited in scope to the objects contained in the database DB1 where the database role 415 is defined.

When a database is replicated, a corresponding account level role could be replicated, or the database itself could be designated as the unit of replication. By defining the database role 415 within database DB1, a clear separation between the database role 415 and the other units of replication (e.g., account level roles) may be realized. Because privileges to a subset of the objects within database DB1 (and no other database) are granted to the database role 415, the database role 415 and the subset of the objects to which it has been granted privileges (e.g., modularized privileges) are all maintained in the database DB1. In addition, the provider account 410 must have a usage privilege on the database DB1 where the database role 415 is defined in order to resolve it.

In this way, if the provider account 410 grants to a consumer account access to a share object which has been granted privileges to the database DB1, then the consumer account may see all of the contents of DB1. However, by utilizing multiple database roles that are each granted privileges to particular objects (e.g., subsets of the objects) within the database DB1, the consumer account may only see/access objects for which privileges have been granted to the database roles the consumer account has been granted access to.

Because a new object type is being used, the database role 415 can be referenced by its fully qualified name or its relative name, using the session's current database. For example, "DATABASE ROLE DB1.415" may reference database role 415 in database DB1. In another example, "DATABASE ROLE 415" may reference database role 415 in a current database. By contrast, "ROLE ROLE1" may reference an account level role called ROLE1. A provider account can use a command such as e.g., "CREATE DATABASE ROLE DB1.415" in order to generate the database role 415 within database DB1. A provider who wishes to create a database role must have privileges for creating database roles in the database they wish to create it in (e.g., DB1), as well as a usage privilege on that database in order to do so.

A database role can be granted to account level roles, or other database roles that are within the same database. A database role cannot be granted to another database role from a different database. In some embodiments, a command such as e.g., "SHOW ROLES" may be used by a consumer to reveal all account level roles, while a command such as e.g., "show database roles in database DB1" may to reveal all database roles within the database DB1 (assuming a local database named DB1 was created from the data application). Further, a command such as e.g., "show roles in database DB1" may list the database roles within the database DB1. In other words, the "DATABASE" keyword for the "SHOW" command is optional, but only for that query type. It should be noted that no account level roles or database roles from another database will be shown when executing such a command.

It should be noted that although the following examples are discussed in terms of the database container a database role is defined within being a database, this is by example only the database container may be any appropriate container such as e.g., a schema.

Figure 5A:
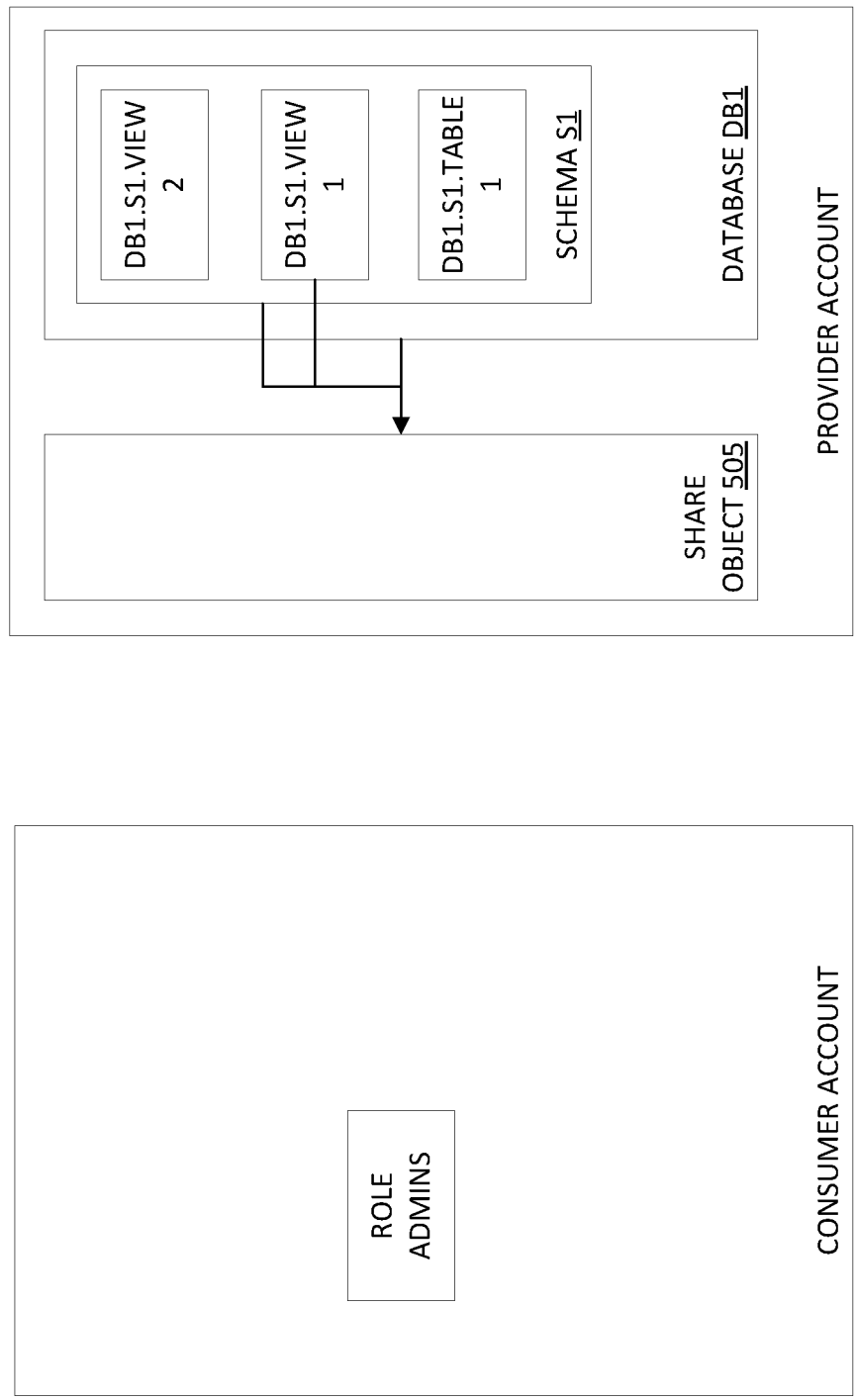

FIGS. 5A-5D illustrate the life cycle of database roles (shown as DB1.ROLE1 and DB1.ROLE2) in the context of providing modular access to the contents of a database DB1. As shown in FIG. 5A, the provider account may create database DB1 which includes schema DB1.S1 which in turn includes views DB1.S1.VIEW1 and DB1.S1.VIEW2 as well as table DB1.S1.TABLE1. The provider account may then create a share object 505 and grant a usage privilege on DB1 to the share object 505, grant a usage privilege on DB1.S1 to the share object 505, and grant a select privilege on DB1.S1.VIEW1 to the share object 505.

Figure 5B:
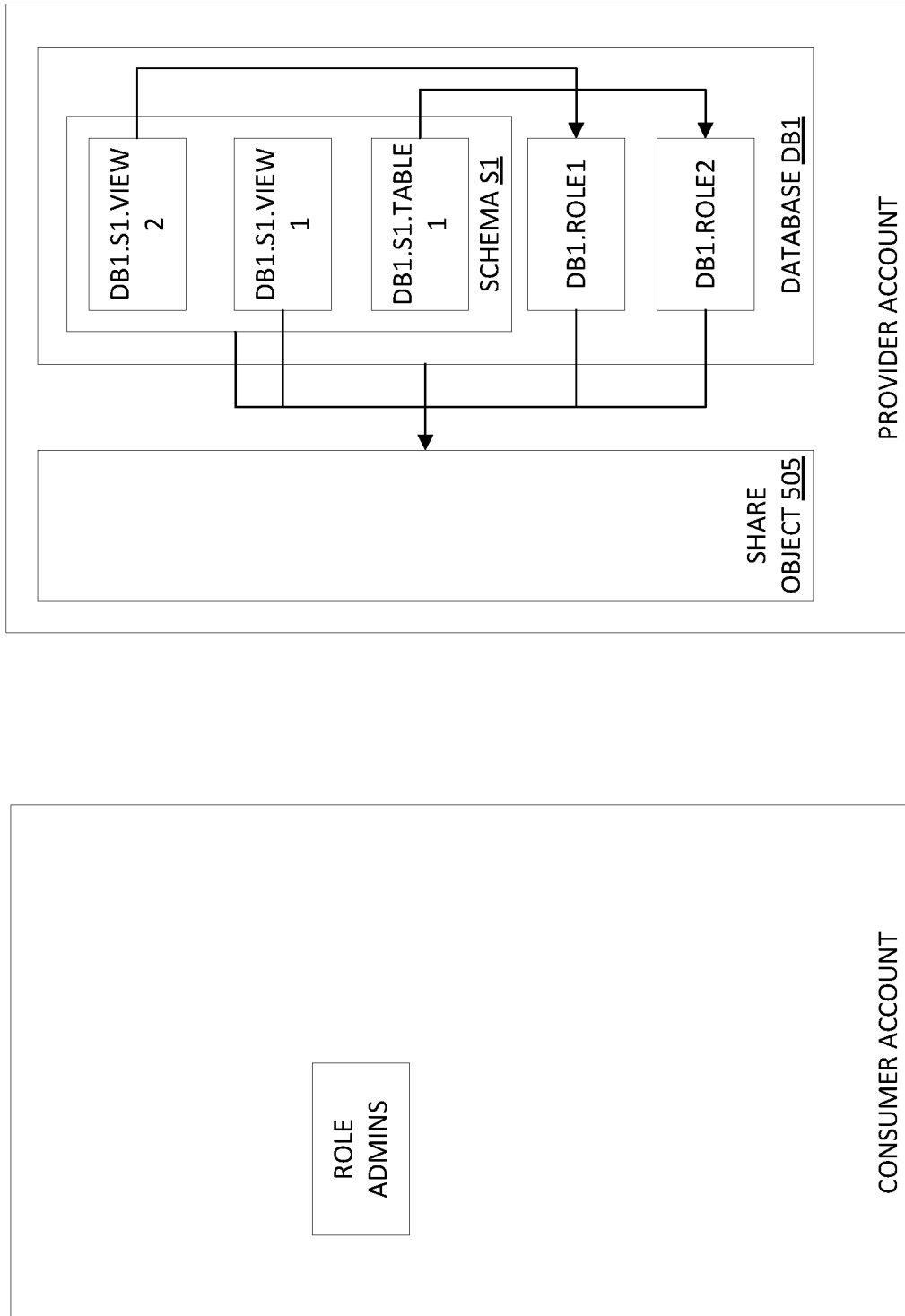

As shown in FIG. 5B, the provider may create a database role called "DB1.ROLE1," grant a usage privilege on DB1.S1 to DB1.ROLE1 and then grant a select privilege on DB1.S1.VIEW2 to DB1.ROLE1. The provider account may also create a database role called "DB1.ROLE2," grant a usage privilege on DB1.S1 to DB1.ROLE2 and then grant a select privilege on DB1.S1.TABLE1 to DB1.ROLE2. The provider may then add DB1.ROLE1 and DB1.ROLE2 to the share object 505 e.g., by granting DB1.ROLE1 and DB1.ROLE2 to the share object 505 so that objects granted to DB1.ROLE1 and DB1.ROLE2 are automatically available to the share object 505. At this point, the share object 505 has access to both views DB1.S1.VIEW1 and DB1.S1.VIEW2 via having a select privilege on DB1.S1.VIEW1 granted to it and having DB1.ROLE1 granted to it and also has access to the table DB1.S1.TABLE1 via having DB1.ROLE2 granted to it.

Figure 5C:
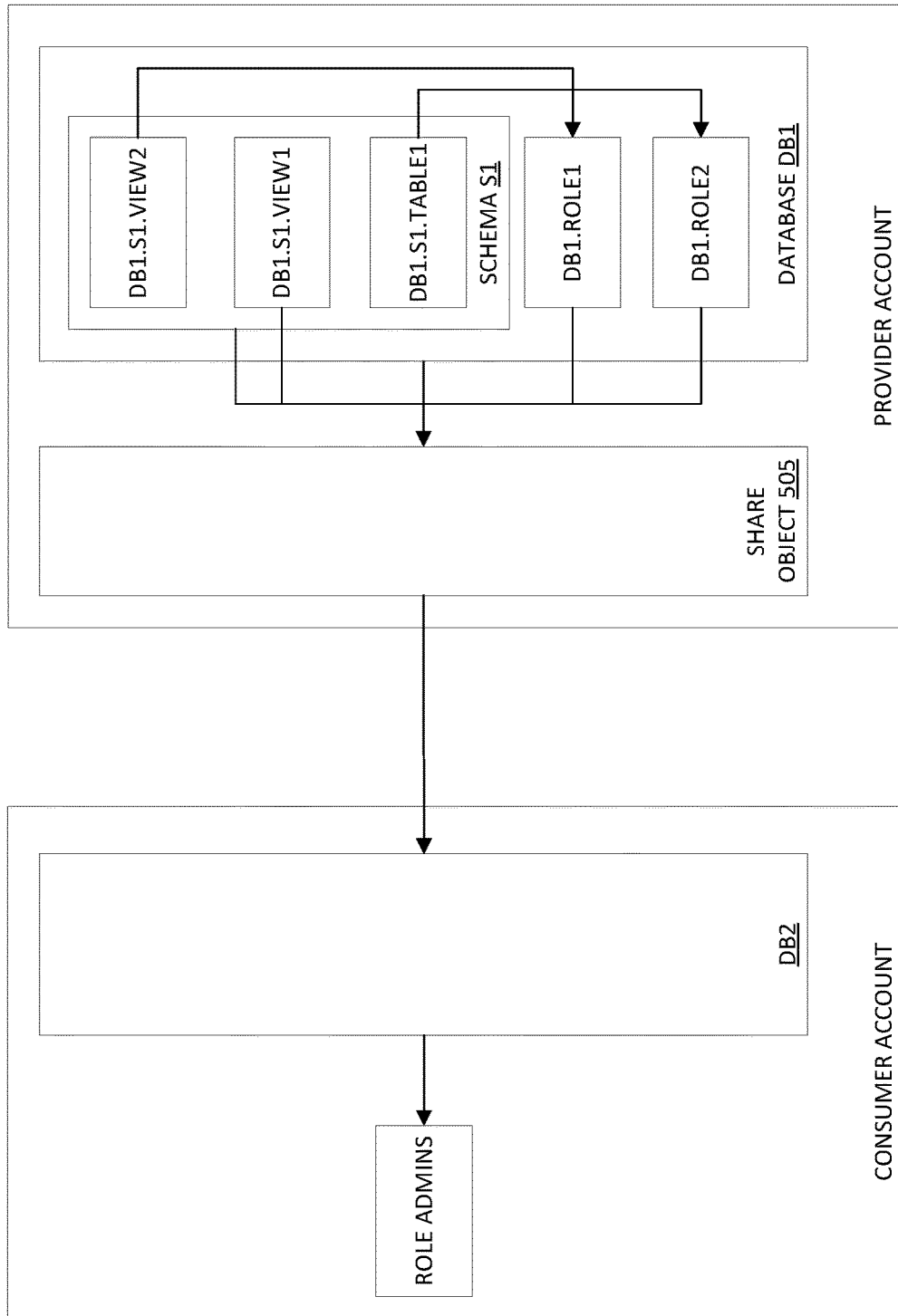

As shown in FIG. 5C, the consumer may mount the share object 505 and create a new shared database (referred to as DB2) from the share object 505. DB2 may have a copy of the DB1.ROLE1 and DB1.ROLE2 database roles, which may be referred to as DB2.ROLE1 and DB2.ROLE2 because they are in the DB2 namespace. The consumer account may run a command to generate a list of shared database roles within DB2, which may reveal DB2.ROLE1 and DB2.ROLE2. The consumer may then run a command to list the privileges that have been granted to DB2.ROLE1 and DB2 ROLE2, which may reveal the usage privilege on schema DB1.S1 and the select privilege on DB1.S1.VIEW2 that were granted to DB1.ROLE1 and the usage privilege on schema DB1.S1 and the select privilege on DB1.S1.TABLE1 that were granted to DB1.ROLE2 (all of which are now duplicated in DB2.ROLE1 and DB2.ROLE2 respectively). As shown in FIG. 5D, the consumer account may grant DB2.ROLE1 to the EMPLOYEES role which is an account level role, and by doing so grant select access to DB1.S1.VIEW2 (but not DB1.S1.VIEW1 or DB1.S1.TABLE1) to the EMPLOYEES role. Stated differently, while DB2 has access to both DB1.S1.VIEW1 and DB1.S1.VIEW2 as well as DB1.S1.TABLE1, the EMPLOYEES role only has access to DB1.S1.VIEW2. The consumer account may also grant DB2.ROLE2 to the MANAGERS role which is also an account level role, and by doing so grant a select privilege on DB1.S1.TABLE1 (but not DB1.S1.VIEW1 or DB1.S1 VIEW2) to the MANAGERS role. Stated differently, while DB2 has access to both DB1.S1.VIEW1 and DB1.S1.VIEW2 as well as DB1.S1.TABLE1, the MANAGERS role only has access to DB1.S1.TABLE1. In this way, modular access to the contents of DB1 is achieved.

As can be seen, the use of database roles does not involve the creation of proxy objects in the consumer account that represent shared objects on which the consumer account can grant local privileges. For example, the use of database roles to share a table called table1 does not require creation of a table called proxied_table1 in the consumer account or the provision of a select grant on proxied_table1 to e.g., the EMPLOYEES role. This prevents any aspects of the data sharing lifecycle of shared objects from falling under the responsibility of e.g., the operator of the data exchange. For example, if creation of a proxy object in the consumer account was required for every shared object, then there would be two separate copies of metadata associated with the shared object, as well as potentially two separate copies of the underlying data as well. This in turn would require updating each local proxied object (on the consumer side) when the original object on the provider side is updated, modified, or deleted. Embodiments of the present disclosure circumvent this by dispensing with the need for proxy objects representing shared objects.

Figure 6:
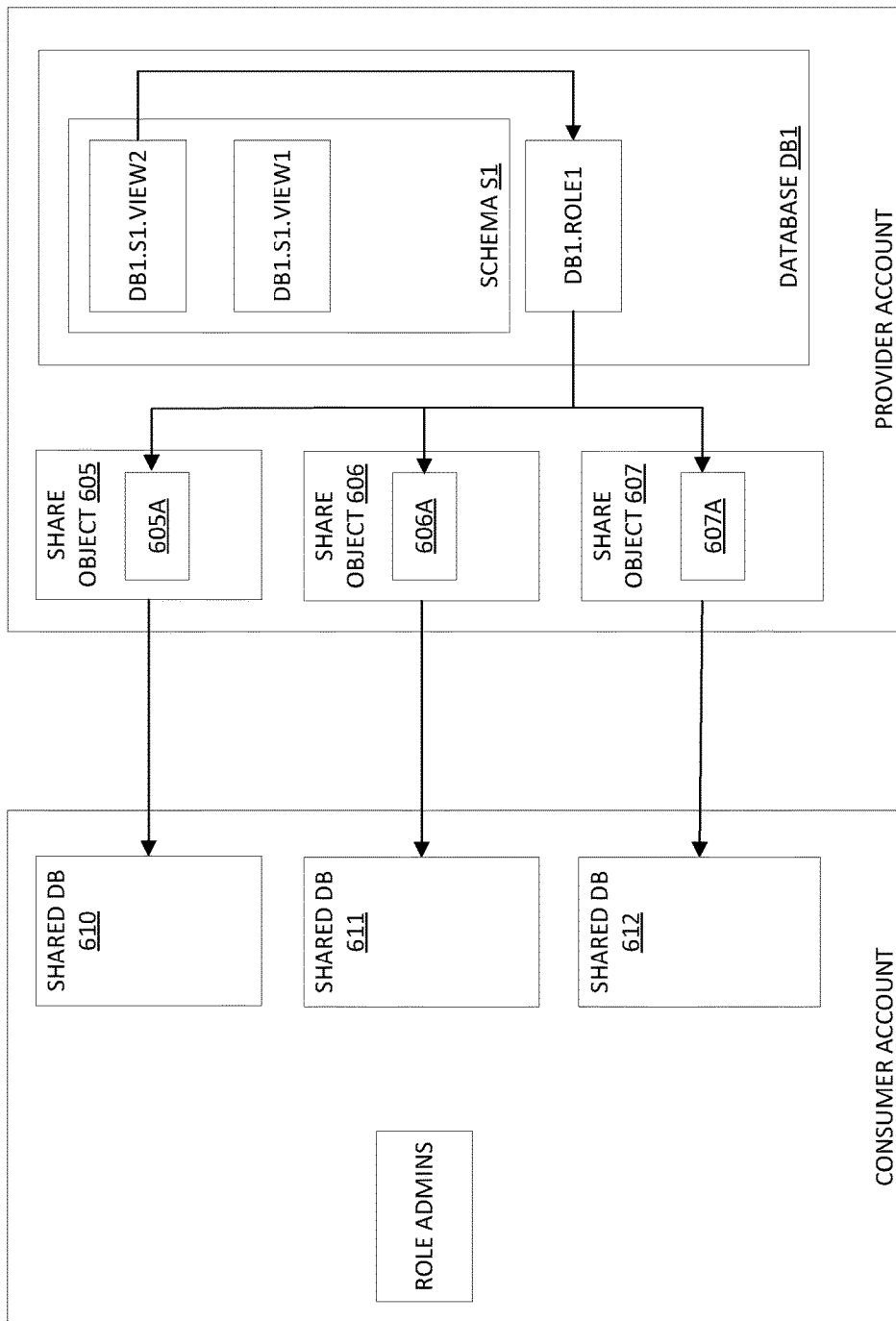
FIG. 6 is a diagram illustrating the use of hidden roles to grant a database role to a share object, in accordance with some embodiments of the present invention.

In some scenarios a provider account may grant a database role to multiple share objects and a consumer account may mount each of the multiple share objects to generate multiple imported databases in the consumer account. Subsequently, the consumer account may grant the imported database role in each imported database to the same account level role. However, in such situations, a different database object must be granted to each share object in a separate grant, otherwise a single revoke operation for a given share object/imported database will result in all grants of the database role to be revoked. To prevent this, embodiments of the present disclosure utilize a concept referred to as a hidden role when granting a database role to a share object. FIG. 6 is a block diagram of a deployment 600 in which the use of hidden roles to grant a database role to one or more share objects is illustrated. As shown in FIG. 6, when a provider account wishes to grant a database role (DB1.ROLE1) to a share object 605, it may create a new hidden role 605A. The hidden role 605A may be a database role or an account level role and may be anonymous (i.e., without a name). DB1.ROLE1 may be granted to the hidden role 605A and the hidden role 605A may be granted to share object 605. DB1.ROLE1 may be granted to each share object 605, 606, and 607 in this manner in order to establish a one to one relationship between database roles and share objects. By doing so, revocation of DB1.ROLE1 from e.g., share object 605 will not affect the grant of DB1.ROLE1 to share object 606 or 607. Once DB1.ROLE1 has been granted to each share object 605-607 in this manner, the consumer account may mount each share object 605-607 and generate a shared database 610-612 based on each of the share objects 605-607 respectively. In addition, when a share object is deleted, or an account is removed from a share object, the use of hidden objects also ensures that only the grants provided through that share object are dropped. In short, any time a database role is granted to a share object, a hidden role for that granted database role and for the share object (i.e., share grantee) will be created.

In some embodiments, any objects granted by a provider account to a share object will not result in objects being automatically created in the consumer account. In this way, lifecycle problems can be avoided. For example, if a shared database role is renamed, there is no need for all existing automatically created objects to be renamed as well. In another example, if a database role is dropped, there is no need for all existing automatically created objects to be dropped as well. In a further example, if a new database role is added to the share object in the provider account, objects to which the new database role has been granted privileges will not automatically be created in all existing shared databases in consumer accounts.

In some embodiments, database roles may also be used in data replication scenarios. For example, when a database having one or more database roles is replicated (e.g., with the database as the unit of replication) along with the tables and other objects beneath it, the relationships between the database roles and the objects in the database (e.g., grants to the database role) can be maintained.

As can be seen, embodiments of the present disclosure may be used to group data using database roles which may act like mini-share objects within a share object and allow more granular access to the contents of a database. The use of database roles also provides simplified entitlements management for consumers and simplified auditing by mapping permissions to an account level role. More specifically, with entitlement management centralized within a database role, the process of auditing the users (other account level roles) who have the database role and the set of permissions they will inherit.

Using database roles as described herein also allows new objects that are added to a database to be available immediately for consumption by consumer account users who have been granted database roles. Stated differently, once the sharing via a database role is configured and being utilized as discussed herein, any newly added object that is granted to the database role on the provider side will automatically become available/visible to the account level role that has the equivalent database role on the consumer side via the imported share. The use of database roles also helps to keep the number of cross-grants between account level roles to a minimum. Further, because no proxy objects are created in the consumer account, there are no synchronization issues.

As discussed herein, one way to materialize a database container in a consumer account is by creating a proxy object that indicates that it is linked to the shared database that lives in the provider account. In some embodiments, because consumers may know more about how they wish for data access privileges to be defined, the cloud deployment 405 of FIG. 4 may allow a consumer account to materialize and create a local proxy object for every single object that the provider account wishes to share.

Figure 7:
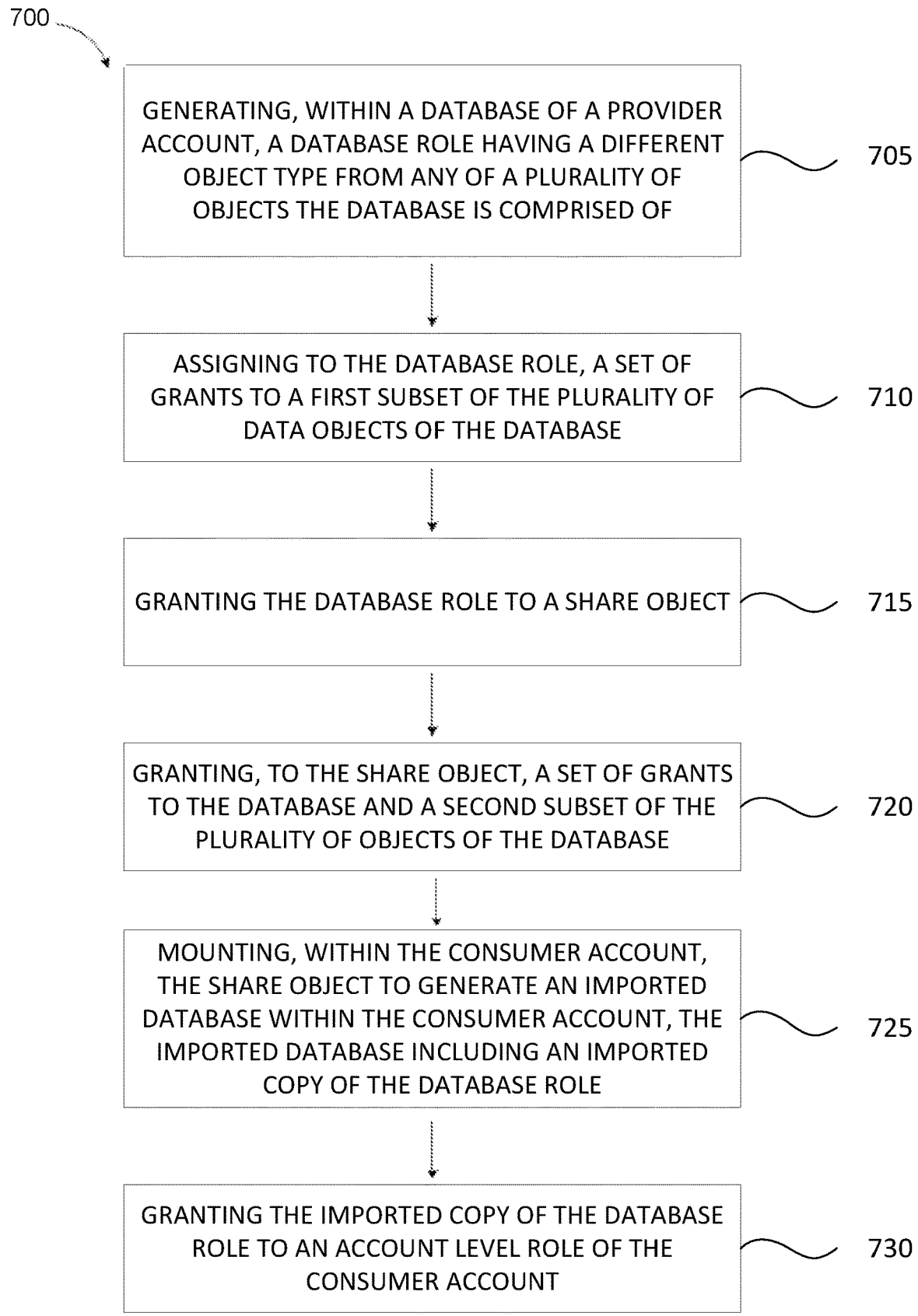
FIG. 7 is a flow diagram of a method for using database roles to provide modularized data sharing, in accordance with some embodiments of the present invention.

FIG. 7 is a flow diagram of a method 700 for using database roles to allow sharing of a database's data in a more granular fashion, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a processing device of cloud deployment 405 (illustrated in FIG. 4).

Referring simultaneously to FIGS. 5A-5D, at block 705, the provider may create a database role called "DB1.ROLE1" within DB1 and at block 710 may grant a usage privilege on DB1.S1 to DB1.ROLE1 and then grant a select privilege on DB1.S1.VIEW2 to DB1.ROLE1. The provider account may also create a database role called "DB1.ROLE2," grant a usage privilege on DB1.S1 to DB1.ROLE2 and then grant a select privilege on DB1.S1.TABLE1 to DB1.ROLE2. The provider account may then create a share object 505 and at block 715 may add DB1.ROLE1 and DB1.ROLE2 to the share object 505 e.g., by granting DB1.ROLE1 and DB1.ROLE2 to the share object 505 so that objects granted to DB1.ROLE1 and DB1.ROLE2 are automatically available to the share object 505. At block 720 the provider account may grant a usage privilege on DB1 to the share object 505, grant a usage privilege on DB1.S1 to the share object 505, and grant a select privilege on DB1.S1.VIEW1 to the share object 505. At this point, the share object 505 has access to both views DB1.S1.VIEW1 and DB1.S1.VIEW2 via having a select privilege on DB1.S1.VIEW1 granted to it and having DB1.ROLE1 granted to it and also has access to the table DB1.S1.TABLE1 via having DB1.ROLE2 granted to it.

At block 725, (referring to FIG. 5C) the consumer may mount the share object 505 and create a new shared database (referred to as DB2) from the share object 505. DB2 may have a copy of the DB1.ROLE1 and DB1.ROLE2 database roles, which may be referred to as DB2.ROLE1 and DB2.ROLE2 because they are in the DB2 namespace. The consumer account may run a command to generate a list of shared database roles within DB2, which may reveal DB2.ROLE1 and DB2.ROLE2. The consumer may then run a command to list the privileges that have been granted to DB2.ROLE1 and DB2.ROLE2, which may reveal the usage privilege on schema DB1.S1 and the select privilege on DB1.S1.VIEW2 that were granted to DB1.ROLE1 and the usage privilege on schema DB1.S1 and the select privilege on DB1.S1.TABLE1 that were granted to DB1.ROLE2 (all of which are now duplicated in DB2.ROLE1 and DB2.ROLE2 respectively). At block 730, the consumer account may grant DB2.ROLE1 to the EMPLOYEES role which is an account level role, and by doing so grant select access to DB1.S1.VIEW2 (but not DB1.S1.VIEW1 or DB1.S1.TABLE1) to the EMPLOYEES role. Stated differently, while DB2 has access to both DB1.S1.VIEW1 and DB1.S1.VIEW2 as well as DB1.S1.TABLE1, the EMPLOYEES role only has access to DB1.S1.VIEW2. The consumer account may also grant DB2.ROLE2 to the MANAGERS role which is also an account level role, and by doing so grant a select privilege on DB1. S TABLE1 (but not DB1.S1.VIEW1 or DB1.S1.VIEW2) to the MANAGERS role. Stated differently, while DB2 has access to both DB1.S1.VIEW1 and DB1.S1.VIEW2 as well as DB1.S1.TABLE1, the MANAGERS role only has access to DB1.S1.TABLE1. In this way, modular access to the contents of DB1 is achieved.

Figure 8:
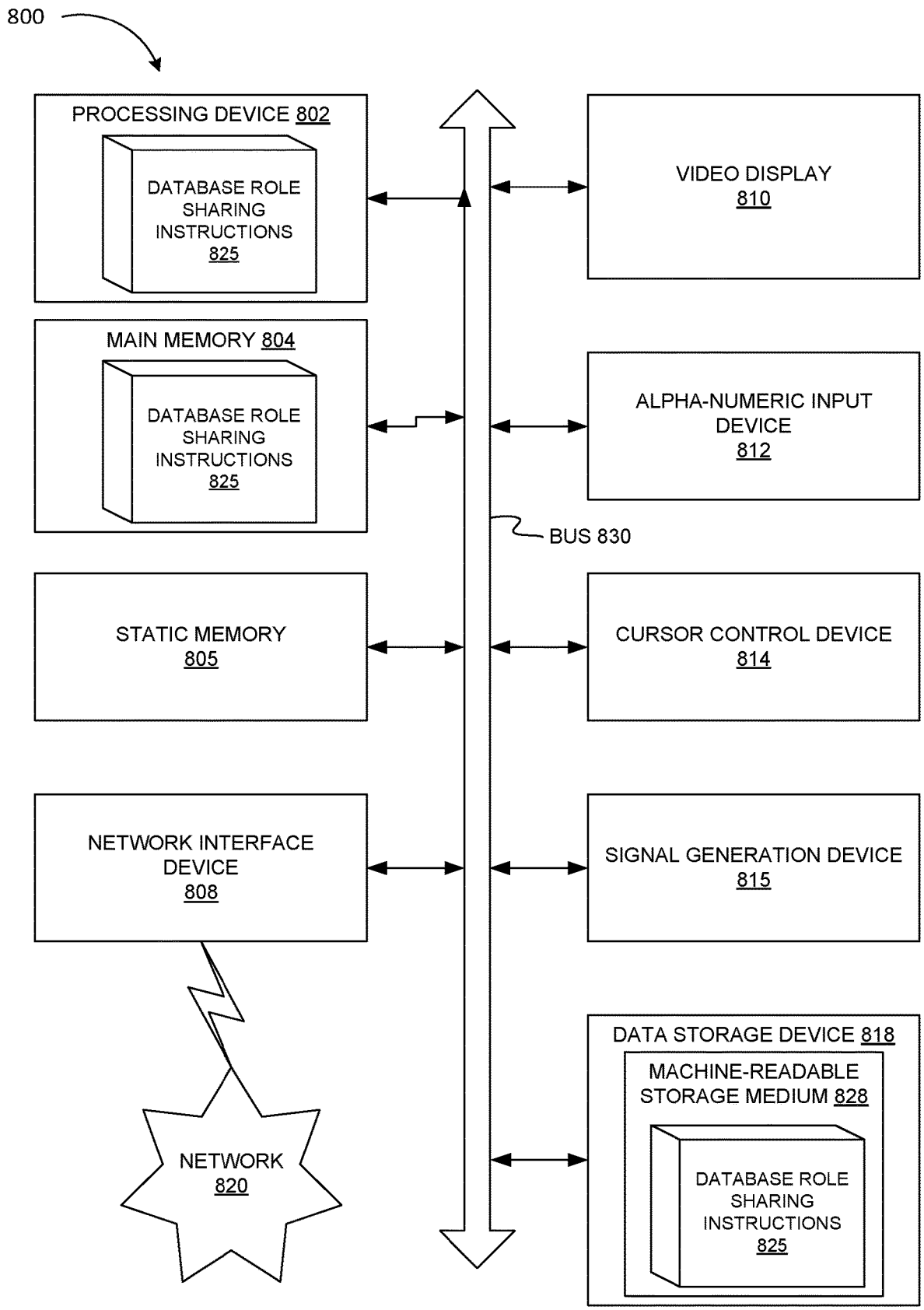
FIG. 8 is a block diagram of an example computing device that may perform one or more of the operations described herein, in accordance with some embodiments of the present invention.

FIG. 8 illustrates a diagrammatic representation of a machine in the example form of a computer system 800 within which a set of instructions, for causing the machine to perform any one or more of the methodologies discussed herein for replicating a share object to a remote deployment. More specifically, the machine may modify a share object of a first account into a global object wherein the share object includes grant metadata indicating share grants to a set of objects of a database. The machine may create, in a second account located in a remote deployment, a local replica of the share object on the remote deployment based on the global object and replicate the set of objects of the database to a local database replica on the remote deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server.

The exemplary computer system 800 includes a processing device 802, a main memory 804 (e.g., read-only memory (ROM), flash memory, dynamic random access memory (DRAM), a static memory 805 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 800 may further include a network interface device 908 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute database role sharing instructions 825, for performing the operations and steps discussed herein.

The data storage device 818 may include a machine-readable storage medium 828, on which is stored one or more sets of database role sharing instructions 825 (e.g., software) embodying any one or more of the methodologies of functions described herein. Database role sharing instructions 825 may also reside, completely or at least partially, within the main memory 804 or within the processing device 802 during execution thereof by the computer system 800; the main memory 804 and the processing device 802 also constituting machine-readable storage media. The database role sharing instructions 825 may further be transmitted or received over a network 820 via the network interface device 808.

The machine-readable storage medium 828 may also be used to store instructions to perform a method for determining functions to compile, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
generating, within a database of a provider account, a database role having a different object type from any of a plurality of objects the database is comprised of;
assigning to the database role, a set of grants to a first subset of the plurality of data objects of the database;
granting the database role to a share object;
assigning, to the share object, a set of grants to a second subset of the plurality of objects of the database;
mounting, within a consumer account, the share object to generate an imported database within the consumer account, the imported database including an imported copy of the database role; and
granting the imported copy of the database role to an account level role of the consumer account.

2. The method of claim 1, further comprising:
updating the database with an additional object; and
assigning to the database role, a grant to the additional object, wherein the additional object is immediately available to the account level role of the consumer account.

3. The method of claim 2, wherein no new objects are created by the consumer account in response to the additional object being added to the database.

4. The method of claim 1, wherein the imported database may access the first and second subsets of the plurality of data objects and the account level role may access the first subset of the plurality of data objects.

5. The method of claim 1, wherein the database role does not include grants to objects outside of the database.

6. The method of claim 1, wherein granting the database role to the share object comprises:
creating a hidden role;
granting the database role to the hidden role; and
granting the hidden role to the share object.

7. The method of claim 6, wherein the hidden role comprises a database role or an account level role.

8. A system comprising:
a memory; and
a processing device, operatively coupled to the memory, the processing device to:
generate, within a database of a provider account, a database role having a different object type from any of a plurality of objects the database is comprised of;
assign to the database role, a set of grants to a first subset of the plurality of data objects of the database;
grant the database role to a share object;
assign, to the share object, a set of grants to a second subset of the plurality of objects of the database;
mount, within a consumer account, the share object to generate an imported database within the consumer account, the imported database including an imported copy of the database role; and
grant the imported copy of the database role to an account level role of the consumer account.

9. The system of claim 8, wherein the processing device is further to:
update the database with an additional object; and
assign to the database role, a grant to the additional object, wherein the additional object is immediately available to the account level role of the consumer account.

10. The system of claim 9, wherein no new objects are created by the consumer account in response to the additional object being added to the database.

11. The system of claim 8, wherein the imported database may access the first and second subsets of the plurality of data objects and the account level role may access the first subset of the plurality of data objects.

12. The system of claim 8, wherein the database role does not include grants to objects outside of the database.

13. The system of claim 8, wherein to grant the database role to the share object, the processing device is to:
create a hidden role;
grant the database role to the hidden role; and
grant the hidden role to the share object.

14. The system of claim 13, wherein the hidden role comprises a database role or an account level role.

15. A non-transitory computer-readable medium having instructions stored thereon which, when executed by a processing device, cause the processing device to:
generate, within a database of a provider account, a database role having a different object type from any of a plurality of objects the database is comprised of;
assign to the database role, a set of grants to a first subset of the plurality of data objects of the database;
grant the database role to a share object;
assign, to the share object, a set of grants to a second subset of the plurality of objects of the database;
mount, within a consumer account, the share object to generate an imported database within the consumer account, the imported database including an imported copy of the database role; and
grant the imported copy of the database role to an account level role of the consumer account.

16. The non-transitory computer-readable medium of claim 15, wherein the processing device is further to:
update the database with an additional object; and
assign to the database role, a grant to the additional object, wherein the additional object is immediately available to the account level role of the consumer account.

17. The non-transitory computer-readable medium of claim 16, wherein no new objects are created by the consumer account in response to the additional object being added to the database.

18. The non-transitory computer-readable medium of claim 15, wherein the imported database may access the first and second subsets of the plurality of data objects and the account level role may access the first subset of the plurality of data objects.

19. The non-transitory computer-readable medium of claim 15, wherein the database role does not include grants to objects outside of the database.

20. The non-transitory computer-readable medium of claim 15, wherein to grant the database role to the share object, the processing device is to:
create a hidden role;
grant the database role to the hidden role; and
grant the hidden role to the share object.

21. The non-transitory computer-readable medium of claim 20, wherein the hidden role comprises a database role or an account level role.

* * * * *